United States Patent
Zhao et al.

(10) Patent No.: US 10,462,751 B2
(45) Date of Patent: Oct. 29, 2019

(54) METHOD AND APPARATUS FOR COORDINATING RESOURCES BETWEEN DIFFERENT TYPES OF COMMUNICATIONS

(71) Applicant: Telefonaktiebolaget LM Ericsson (publ), Stockholm (SE)

(72) Inventors: Zhenshan Zhao, Beijing (CN); Qianxi Lu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 175 days.

(21) Appl. No.: 15/112,856

(22) PCT Filed: Jan. 28, 2014

(86) PCT No.: PCT/CN2014/071693
§ 371 (c)(1),
(2) Date: Jul. 20, 2016

(87) PCT Pub. No.: WO2015/113221
PCT Pub. Date: Aug. 6, 2015

(65) Prior Publication Data
US 2016/0345274 A1 Nov. 24, 2016

(51) Int. Cl.
*H04W 4/00* (2018.01)
*H04W 52/24* (2009.01)
(Continued)

(52) U.S. Cl.
CPC ....... *H04W 52/243* (2013.01); *H04W 52/383* (2013.01); *H04W 52/386* (2013.01);
(Continued)

(58) Field of Classification Search
CPC .................................................. H04W 72/082
See application file for complete search history.

(56) References Cited

U.S. PATENT DOCUMENTS 6,473,617 B1 * 10/2002 Larsen ................. H04B 7/2606
455/446
9,232,391 B2 * 1/2016 Wang .................... H04W 12/04
(Continued)

FOREIGN PATENT DOCUMENTS

| CN | 102761978 A | 10/2012 |
|---|---|---|
| CN | 102792745 A | 11/2012 |

(Continued)

OTHER PUBLICATIONS

3GPP "3rd Generation Partnership Project; Technical Specification Group Radio Access Network; Evolved Universal Terrestrial Radio Access (E-UTRA); Physical channels and modulation (Release 11)", 3GPP TS 36.211 V11.5.0, Dec. 2013, 1-120.

(Continued)

*Primary Examiner* — Guang W Li
(74) *Attorney, Agent, or Firm* — Sage Patent Group

(57) ABSTRACT

Embodiments of the present invention provide a method (400) for use in a terminal device for coordinating resources between two different types of communications. The method comprises receiving (410) resource allocation information indicating the allocation of resource units for the two different types of communications and determining (420), based on the resource allocation information, whether there will be a collision between the two different types of communications on a specific resource unit. The method also comprises in response to determining that there will be a collision between the two different types of communications on the specific resource unit, adjusting (430) one of the two different types of communications on the specific resource unit such that the collision may be avoided. The method further comprises resuming (440) the adjusted one of the two different types of communications on a next (Continued)

non-colliding resource unit allocated for the adjusted type of communications.

7 Claims, 5 Drawing Sheets

(51) Int. Cl.
  *H04W 72/08* (2009.01)
  *H04W 52/38* (2009.01)
  *H04W 72/04* (2009.01)
  *H04W 74/08* (2009.01)

(52) U.S. Cl.
  CPC ..... *H04W 72/042* (2013.01); *H04W 72/0473* (2013.01); *H04W 72/082* (2013.01); *H04W 74/085* (2013.01)

(56) References Cited

U.S. PATENT DOCUMENTS

| | | | | |
|---|---|---|---|---|
| 9,264,968 B2* | 2/2016 | Tabet | .................... | H04W 36/30 |
| 9,319,931 B2* | 4/2016 | Lim | .................... | H04W 72/085 |
| 2012/0129540 A1* | 5/2012 | Hakola | ............... | H04W 72/042 |
| | | | | 455/450 |
| 2013/0150061 A1* | 6/2013 | Shin | .................... | H04W 4/70 |
| | | | | 455/450 |
| 2013/0229938 A1* | 9/2013 | Jung | .................... | H04J 11/005 |
| | | | | 370/252 |
| 2013/0324182 A1 | 12/2013 | Deng et al. | | |
| 2014/0086212 A1* | 3/2014 | Kafle | .................... | H04B 17/345 |
| | | | | 370/331 |
| 2014/0372775 A1* | 12/2014 | Li | .................... | H04L 49/405 |
| | | | | 713/300 |
| 2015/0063098 A1* | 3/2015 | Yavuz | .................... | H04W 24/02 |
| | | | | 370/229 |
| 2015/0063148 A1* | 3/2015 | Sadek | .................... | H04W 74/0816 |
| | | | | 370/252 |
| 2015/0071133 A1* | 3/2015 | Li | .................... | H04W 72/1278 |
| | | | | 370/278 |
| 2015/0200756 A1* | 7/2015 | Lee | .................... | H04L 5/0048 |
| | | | | 370/329 |
| 2015/0264652 A1* | 9/2015 | Zhang | .................... | H04W 52/143 |
| | | | | 455/522 |
| 2016/0081044 A1* | 3/2016 | Wang | .................... | H04W 52/243 |
| | | | | 370/329 |
| 2016/0249198 A1* | 8/2016 | Kim | .................... | H04W 48/16 |

FOREIGN PATENT DOCUMENTS

| | | |
|---|---|---|
| WO | 2014089791 A1 | 6/2014 |
| WO | 2014117358 A1 | 8/2014 |

OTHER PUBLICATIONS

Unknown, Author, "Multiplexing between cellular link and D2D link", 3GPP TSG RAN WG1 Meeting #75, R1-135093, CATT, San Francisco, CA, Nov. 11-15, 2013, 1-3.

LG Electronics, "Multiplexing of Uu and D2D Communication", 3GPP TSG RAN WG1 Meeting #75, R1-135482, San Francisco, US, Nov. 11-15, 2013, 1-5.

* cited by examiner

METHOD AND APPARATUS FOR COORDINATING RESOURCES BETWEEN DIFFERENT TYPES OF COMMUNICATIONS

TECHNICAL FIELD

The non-limiting and exemplary embodiments of the present disclosure generally relate to the technical field of radio communications, and specifically to a method and apparatus for resource coordination between two different types of communications, such as device-to-device communications and cellular communications in a Time-Division Duplex TDD system.

BACKGROUND

This section introduces aspects that may facilitate a better understanding of the disclosure. Accordingly, the statements of this section are to be read in this light and are not to be understood as admissions about what is in the prior art or what is not in the prior art.

Recent developments of the Third Generation Partnership Project Long Term Evolution, 3GPP LTE, facilitate accessing local IP based services at home, office, public hot spot or even in outdoor environments. One of the important application cases for the local IP access and local connectivity involves direct communications between devices in close proximity to each other, typically less than a few 10s of meters, and sometimes up to a few hundred meters.

This kind of direct communications, which may also be referred to as Device to Device D2D communications, sometimes enables a number of potential gains over the traditional cellular technique, since in the D2D communications, communicating devices are much closer to each other than in the cellular communications, in which the devices have to communicate via a cellular access point AP or a base station. Therefore, a network structure covering both cellular and D2D communications as illustrated in FIG. 1 is becoming more attractive.

In 3GPP, it has been concluded that for an intra-user equipment UE case where the UE conducts both cellular communications and D2D communications, the cellular uplink UL transmission from the UE and D2D activity, i.e. transmission and reception will be conducted in a Time-Division Multiplexing TDM way so as to avoid collisions. As for an inter-UE case where the cellular communications and D2D communications are conducted between different UEs, although there is no clear conclusion yet, the TDM is also a promising scheme to deal with cellular/D2D collisions by considering the conclusion in 3GPP that idle D2D transmissions can use the cellular DL timing reference, which is different from the cellular UL transmission timing and the different transmission timing of the cellular and D2D communications being a cause for severe inter-frequency interference due to unorthogonality.

In order to effectively divide resources between the cellular and D2D communications in a mixed 3GPP LTE cellular and D2D network, two problems shall be considered. The first problem is how to enable D2D transmissions to avoid cellular UL control channels, including Physical Uplink Control Channel PUCCH carrying uplink control information, e.g. ACK/NACK feedback, Scheduling Request SR, Channel State Information/Pre-coding Indicator/Rank Indicator CSI/PMI/RI, Physical Random Access Channel PRACH and Sounding Reference Signal SRS. The second problem is how to enable D2D transmissions to avoid cellular UL data channels, including both Physical Uplink Shared Channel PUSCH new transmissions and Hybrid Automatic Repeat Request HARQ re-transmissions.

Among the above mentioned cellular UL transmissions, static PUCCH transmissions, e.g. SR and CSI/PMI/RI, PRACH and SRS have a fixed periodicity and can be configured by the network. Dynamic PUCCH, e.g. ACK/NACK feedback, and PUSCH new-transmissions can be dynamically controlled on a subframe basis by the network. However, for PUSCH HARQ re-transmissions, there is a strict timing relationship between respective transmission occasions, since synchronous HARQ processes are used by the cellular UL.

Therefore, it is difficult to allocate resources for the D2D communications so that it can avoid all possible cellular UL transmissions, especially in TDD Uplink-Downlink configurations (which will be abbreviated as UL-DL configurations hereafter) 0 and 6 as specified in table 4.2-2 of 3GPP TS 36.211, which are more beneficial to D2D communications since there are more UL subframes than DL subframes.

The first problem as mentioned above is touched by the recent contribution R1-135093 from CATT, which mainly focuses on how to avoid cellular PUCCH ACK/NACK feedback into the D2D resource pool. However, it does not address the above mentioned second problem, e.g. PUSCH re-transmission problem.

The second problem as mentioned above is partly addressed in a PCT patent application PCT/CN2012/086487 for a mixed cellular and D2D system, and in another PCT patent application PCT/CN2013/071191 for a dual connectivity scenario, wherein it is proposed to divide resources in a HARQ-process specific way, i.e. on a HARQ-process basis, for example process I for sub-system A, e.g. cellular, or connectivity 1 while process II for sub-system B, e.g. D2D, or connectivity 2.

As for the PUSCH re-transmission problem, the proposed solutions of PCT/CN2012/086487 and PCT/CN2013/071191 do work well in a Frequency Division Duplex FDD system, and a TDD system with UL-DL configurations 1, 2, 3 and 4 as specified in table 4.2-2 of 3GPP TS 36.211, wherein UL-DL configuration 5 does not work since there is a single UL HARQ process, and thus cannot be further divided.

However, for UL-DL configurations 0 and 6, which have more UL subframes and thus more beneficial to D2D communications, the proposals of PCT/CN2012/086487 and PCT/CN2013/071191 do not work well since the HARQ processes cannot be divided in a 'Transmission Time Interval TTI-specific' way. For example, a HARQ process in TTI (which can be interchangeably used with 'subframe' in LTE) x of a frame would run into TTI x+1 in the next frame, and finally iterates all UL subframes. The 'TTI-specific' division is necessary for solving the first problem, since the UL control channel other than ACK/NACK feedback are all pre-allocated in a 'TTI-specific' way, i.e. pre-allocated with a fixed time offset and periodicity.

In order to solve the above mentioned problem, a traditional 'ACK PHICH (Physical Hybrid-ARQ Indicator Channel) plus non toggled NDI (New Data Indicator)' solution can be used to prevent the PUSCH re-transmissions from occurring in a colliding subframe temporarily. For example, it is assumed that a terminal device is scheduled for an initial transmission in subframe n and if the transmission that is not correctly received, then a retransmission will be conducted in subframe n+8. With non-adaptive hybrid ARQ, the retransmission occupies the same part of the uplink spectrum as the initial transmission. Hence, in this example, the spectrum is fragmented, which limits the bandwidth available for another terminal device. In subframe n+16, an instance of an adaptive retransmission is found, e.g., via ACK in PHICH, and then the terminal device would pause the re-transmission in the current subframe but not flash the data in the buffer, while using non-toggled NDI in the next re-transmission opportunity, but the terminal device would still send the old data to the network. To make a room for another terminal device to be granted a large part of the uplink spectrum, the retransmission is moved in the frequency domain. But this scheme costs extra Downlink Control Information DCI signaling for all terminal devices in the colliding HARQ process.

SUMMARY

Various embodiments of the disclosure aim at addressing at least part of the above problems and disadvantages. Other features and advantages of embodiments of the disclosure will also be understood from the following description of specific embodiments when read in conjunction with the accompanying drawings, which illustrate, by way of example, the principles of embodiments of the disclosure.

Various aspects of embodiments of the disclosure are set forth in the appended claims and summarized in this section. It shall be understood that the scope of the disclosure is limited by the appended claims.

In a first aspect of the disclosure, there is provided a method for use in a terminal device for coordinating resources between two different types of communications. The method comprises receiving resource allocation information indicating the allocation of resource units for the two different types of communications and determining whether there will be a collision between the two different types of communications on a specific resource unit based on the resource allocation information. The method also comprises in response to determining that there will be a collision between the two different types of communications on the specific resource unit, adjusting one of the two different types of communications on the specific resource unit such that the collision can be avoided. The method further comprises resuming the adjusted one of the two different types of communications on a next non-colliding resource unit allocated for the adjusted type of communications on which it is determined that no collision will occur.

In one embodiment, the two different types of communications may comprise device to device communications and cellular communications.

In another embodiment, said adjusting one of the two different types of communications on the specific resource unit may comprise pausing the one of the two different types of communications or reducing transmission power of one of the two different types of communications to minimize interference to the other of the two different types of communications.

In yet another embodiment, the resource allocation information may comprise information regarding a pre-set UL-DL configuration and one or more resource units allocated for the device to device communications.

In yet another embodiment, the resource allocation information may further comprise information regarding a subset of the one or more resource units allocated for the device to device communication, in which there will be cellular transmissions.

In yet another embodiment, the resource unit may comprise a subframe or a resource block.

In yet another embodiment, the resource allocation information may be received from a network entity.

In a second aspect of the disclosure, there is provided a terminal device adapted for coordinating resources between two different types of communications. The terminal device comprises a receiving module configured to receive resource allocation information indicating the allocation of resource units for the two different types of communications and a determining module configured to judge whether there will be a collision between the two different types of communications on a specific resource unit based on the resource allocation information. The terminal device also comprises an adjusting module configured to adjust, when determined by the determining module that there will be a collision between the two different types of communications on the specific resource unit, one of the two different types of communications on the specific resource unit such that the collision can be avoided. The terminal device further comprises a transmitting module configured to resume the adjusted one of the two different types of communications on a next non-colliding resource unit allocated for the adjusted type of communications on which it is determined that no collision will occur.

In one embodiment, the two different types of communications may comprise device to device communications and cellular communications.

In another embodiment, the adjusting module may be further configured to pause one of the two different types of communications or reduce transmission power of one of the two different types of communications to minimize interference to the other of the two different types of communications.

In yet another embodiment, the resource allocation information may comprise information regarding a pre-set UL-DL configuration and one or more resource units allocated for the device to device communications.

In yet another embodiment, the resource allocation information may further comprise information regarding a subset of the one or more resource units allocated for the device to device communications, in which there will be cellular transmissions.

In yet another embodiment, the resource unit may comprise a subframe or a resource block.

In yet another embodiment, the receiving module may further configured to receive the resource allocation information from a network entity.

In a third aspect of the disclosure, there is provided a terminal device adapted for coordinating resources between two different types of communications. The terminal device comprises at least one processor and at least one memory including computer program code, wherein the at least one memory and the computer program code are configured to, with the at least one processor, cause the terminal device at least to receive resource allocation information indicating the allocation of resource units for the two different types of communications and judge whether there will be a collision between the two different types of communications on a specific resource unit based on the resource allocation information. The at least one memory and the computer program code are also configured to, with the at least one processor, cause the terminal device at least to, in response to determining that there will be a collision between the two different types of communications on the specific resource unit, adjust one of the two different types of communications on the specific resource unit such that the collision can be avoided. The at least one memory and the computer program code are further configured to, with the at least one processor, cause the terminal device at least to resume the adjusted one of the two different types of communications on a next non-colliding resource unit allocated for the adjusted type of communications on which it is determined that no collision will occur.

In a fourth aspect of the disclosure, there is provided a terminal device adapted for coordinating resources between two different types of communications. The terminal device comprises processing means adapted to receive resource allocation information indicating the allocation of resource units for the two different types of communications and judge whether there will be a collision between the two different types of communications on a specific resource unit based on the resource allocation information. The processing means is also adapted to, in response to determining that there will be a collision between the two different types of communications on the specific resource unit, adjust one of the two different types of communications on the specific resource unit such that the collision can be avoided. The processing means is further adapted to resume the adjusted one of the two different types of communications on a next non-colliding resource unit allocated for the adjusted type of communications on which it is determined that no collision will occur.

In one embodiment, the processing means may comprise a processor and a memory, wherein the memory contains instructions executable by the processor.

In a fifth aspect of the disclosure, there is provided a computer program comprising instructions which, when executed on at least one processor, cause the at least one processor to carry out the method according to the first aspect of the disclosure.

According to the various aspects and embodiments as mentioned above, resources can be effectively coordinated, in both TTI-specific way and HARQ process-specific way, between two different types of communications, e.g. D2D communications and cellular communications, and thereby collisions, e.g. between D2D transmissions with PUSCH retransmissions or with some static cellular UL transmissions, can be effectively avoided for all usable UL-DL configurations in a mixed cellular and D2D system.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
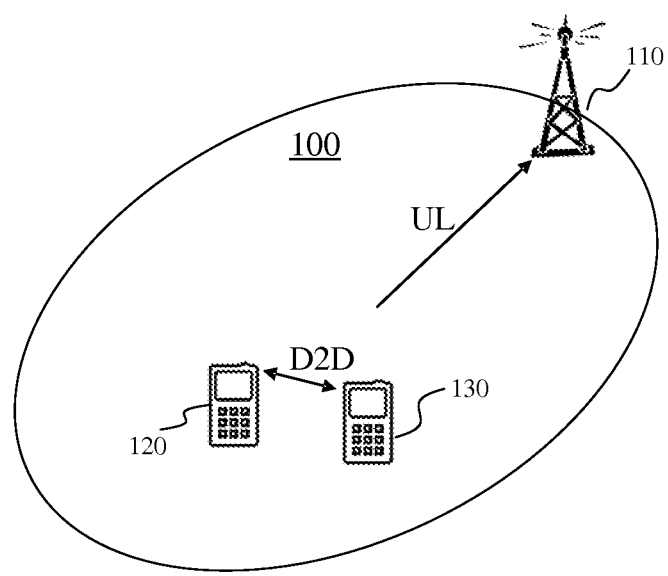
FIG. 1 illustrates a network structure covering both cellular and D2D communications.

Hereinafter, the principle and spirit of the present disclosure will be described with reference to the illustrative embodiments. It should be understood, all these embodiments are given merely for the skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that, although the terms 'first' and 'second' etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skill in the art to which this disclosure belongs. For example, the term terminal device used herein may refer to any terminal capable of wireless communications or user equipment UE, including but not limited to, mobile phone, smart phone, sensor device, meter, vehicle, household appliance, medical appliance, media player, camera, or any type of consumer electronic, for instance, but not limited to, television, radio, lighting arrangement, tablet computer, laptop, portable computer, which has a capability of cellular communications and D2D communications. The terminal device may also be a portable, pocket-storable, hand-held, computer-comprised, or vehicle-mounted mobile device, enabled to communicate voice and/or data, via cellular and D2D connections. Likewise, the term network entity used herein may be any device capable of allocating resources and communicating resource allocation information to the terminal device, including but not limited to, a base station, which sometimes is referred to as e.g. eNB, eNodeB, NodeB, Base Transceiver Station BTS or access point, depending on the technology and terminology used, or any other suitable radio communication intermediary devices, such as a radio relay node or radio router.

In order to clearly describe the embodiments of the present disclosure, the structure of a radio frame and UL-DL configurations in a LTE TDD system are firstly introduced.

Figure 2:
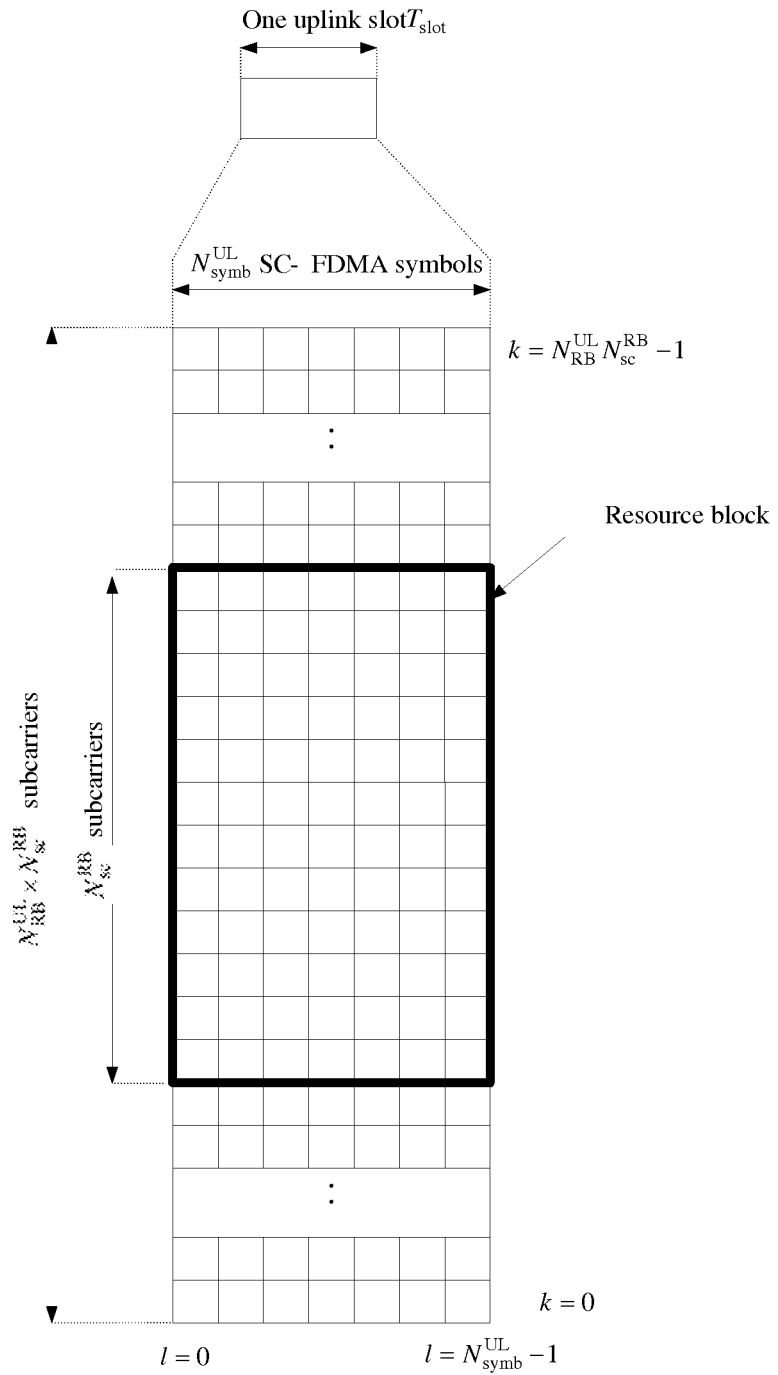
FIG. 2 re-presents a radio slot structure according to FIG. 5.2.1-1 of 3GPP TS 36.211.

In a LTE TDD system, each radio frame consists of two half-frames. Each half-frame consists of five subframes. The supported UL-DL configurations are specified in table 4.2-2 of 3GPP TS 36.211, which is re-presented herein in Table 1, wherein for each subframe in a radio frame, "D" denotes the subframe reserved for downlink transmissions, "U" denotes the subframe reserved for uplink transmissions and "S" denotes a special subframe with the three fields DL Pilot TimeSlot DwPTS, Guard Period GP and UL Pilot TimeSlot UpPTS. UL-DL configurations with both 5 ms and 10 ms DL-to-UL switch-point periodicity are supported. Each subframe is further defined as two slots. FIG. 2 re-presents a slot structure according to FIG. 5.2.1-1 of 3GPP TS 36.211. In each slot is described by one or several resource grids of $N_{RB}^{UL} N_{sc}^{RB}$ subcarriers and $N_{symb}^{UL}$ Single Carrier-Frequency Division Multiple Access SC-FDMA symbols as illustrated in FIG. 2, wherein $N_{symb}^{UL}$ denotes the number of SC-FDMA symbols in an uplink slot; $N_{sc}^{RB}$ denotes the resource block size in the frequency domain, expressed as a number of subcarriers; $N_{RB}^{UL}$ denotes the uplink bandwidth configuration, expressed in multiples of $N_{sc}^{RB}$. A physical resource block, PRB or RB, is defined as $N_{symb}^{UL}$ consecutive SC-FDMA symbols in the time domain and $N_{sc}^{RB}$ consecutive subcarriers in the frequency domain.

TABLE 1

Uplink-downlink configurations

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In table 1, there are six UL-DL configurations, wherein UL-DL configuration 0 comprises six UL subframes and UL-DL configuration 6 comprises five UL subframes. Comparably, UL-DL configurations 0 and 6 may be advantageously used for D2D communications. In the following description, UL-DL configuration 0 will be used as an example to illustrate various embodiments of the present disclosure. However, a person skilled in the art shall understand that the various embodiments based on UL-DL configuration 0 shall be regarded as illustrative instead of limiting. The various embodiments as described herein and any possible variants or equivalents thereof are equivalently applicable for other usable UL-DL configurations.

Figure 3:
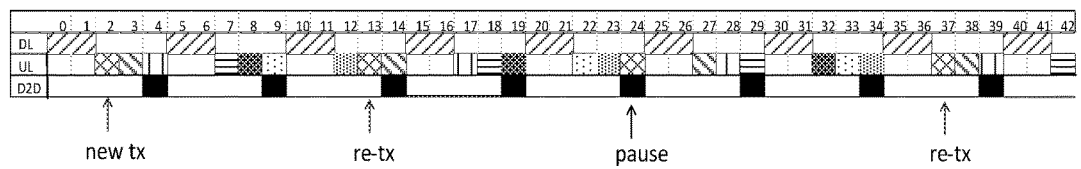
FIG. 3 illustrates an example of resource allocations for cellular and D2D communications with TDD UL-DL configuration 0 according to an embodiment of the disclosure.

Reference is now made to FIG. 3, in which an example of resource allocations for cellular and D2D communications in a case of TDD UL-DL configuration 0 according to one embodiment of the disclosure is illustrated. As illustrated, the number in the first row of FIG. 3 indicates a subframe number; the blocks with right-tilted diagonals in the second row indicate the subframes allocated for cellular DL transmissions; the blocks with different patterns in the third row indicate the subframes allocated for cellular UL transmissions; and the blocks in black in the last row indicate the subframes allocated for D2D communications. In FIG. 3, different HARQ processes for cellular UL transmissions are also shown through difference patterns, e.g., process 0—grids, process 1—left-tilted diagonals, process 2—vertical lines and so on.

From FIG. 3, it can be known that, on a TTI basis, the resource allocation ratio between cellular DL and UL communications is 2:3. In each radio frame, subframes 0 and 1 are allocated for cellular DL transmissions, while subframes 2, 3, and 4 are allocated for cellular UL transmissions. In this example, subframes 4 and 9, i.e. ⅕ of total subframes in one radio frame are allocated for D2D communications.

The exemplary network structure 100 of FIG. 1 comprises a network entity 110, e.g. a base station and two terminal devices 120 and 130, wherein the terminal device 120 can conduct both cellular communications with the network entity 110 and D2D communications with the terminal device 130. Although not shown, a person skilled in the art shall understand that more terminal devices and more network entities may be comprised in the network. The network structure as shown in FIG. 1 shall be regarded as illustrative instead of limiting.

Taking the network structure of FIG. 1 as an example and based on the UL-DL configuration as illustrated in FIG. 3, an example method performed by the terminal device 120 for coordinating resources on a TTI basis between two types of communications, i.e. cellular communications and D2D communications according to a first embodiment of the present disclosure will be described.

Firstly, the terminal device 120 receives resource allocation information that indicates the allocation of resource units for the two types of communications, i.e. D2D communications and the cellular communications in this embodiment. The resource allocation information may be received in a system information block SIB or Radio Resource Control RRC signaling from a network entity, such as the base station 110. In a case where the UL-DL configurations as specified in Table 1 may be pre-configured in the terminal device 120, the received resource allocation information may merely indicate the UL-DL configuration number.

In one embodiment, the resource allocation information may comprise UL-DL configuration information, which is pre-set according to 3GPP TS 36.211 for example, and information indicating one or more resource units allocated for the D2D communications.

In this embodiment, the resource unit may be a subframe. Accordingly, the resource allocation information may comprise the UL-DL configuration information as illustrated in FIG. 3, which indicates in each frame, subframes 0 and 1 are allocated for cellular DL transmissions while subframes 2, 3, and 4 are allocated for cellular UL transmissions, and information indicating one or more subframes, e.g. subframes 4 and 9 of each frame as illustrated in FIG. 3, allocated for the D2D communications.

Additionally or alternatively, the resource unit may be a resource block when a UL subframe is allocated in a Frequency Division Multiplexing FDM way. For example, in a case where FDM is used, RBs 0 to x may be allocated for the cellular communications, while RBs x+1 to y may be allocated for the D2D communications, wherein x and y are variables less than the total number of RBs.

Therefore, based on the received resource allocation information, the terminal device 120 can judge whether there will be a collision between the cellular communications with the base station 110 and the D2D communications with the terminal device 130 on a specific resource unit, e.g. a specific subframe or a specific RB.

Taking HARQ process 0, which is illustrated in a grid pattern in FIG. 3, as an example, the resource allocation information has indicated that a new cellular UL transmission, which is illustrated as "new-tx" in FIG. 3, will be conducted in subframe 2, and if the new cellular UL transmission is not successfully received, a first cellular UL retransmission, which is illustrated as the first "re-tx" in FIG. 3, will occur on subframe 13, and the second cellular UL retransmission will occur on subframe 24, on which a D2D transmission is also assigned. In this case, the terminal device 120 may have known from the resource allocation information that there will be a collision between the cellular communications and the D2D communications on subframe 24.

Then, in response to determining that there will be a collision between the two different types of communications on the specific resource unit, i.e. subframe 24, the terminal device 120 adjusts one of the two different types of communications on the specific resource unit such that the collision can be avoided.

In one embodiment, according to the determining result, the terminal device 120 may autonomously pause one of the two different types of communications on the colliding resource unit, which is illustrated as "pause" in FIG. 3, for example pausing the cellular retransmission or the D2D transmission on subframe 24 as illustrated in FIG. 3 based on their priorities. Various approaches for prioritizing different types of communications are already known in the art. For the sake of simplicity, descriptions regarding these approaches will not be detailed herein. Alternatively, if the two types of communications are conducted in a FDM way, the terminal device may reduce transmission power of one of the two different types of communications according to a power control scheme so as to minimize interference to the other of the two different types of communications. In the example of FIG. 3, the terminal device 120 may reduce the transmission power of the D2D communications so as to minimize the interference to the cellular transmissions on subframe 24. By this way, the performance of the cellular communications can be ensured, and meanwhile the D2D service can be maintained.

Afterwards, the terminal device 120 can resume the adjusted one of the two types of communications on a next non-colliding resource unit allocated for the adjusted type of communications on which it is determined that no collision will occur. In the example of FIG. 3, the terminal device 120 may resume the paused cellular UL retransmission on subframe 37, which is illustrated as the second "re-tx" in FIG. 3, or resume the paused D2D communications on subframe 29, particularly at a normal transmission power level.

Still referring to FIG. 3 and in the network structure of FIG. 1, an example method performed by the terminal device 120 for coordinating resources on a HARQ-process basis between two types of communications, i.e. cellular communications and D2D communications according to a second embodiment of the present disclosure will be described.

Similarly to the first embodiment, the terminal device 120 firstly receives resource allocation information indicating the allocation of resource units for the two types of communications, i.e. the D2D communications and the cellular communications in this embodiment. The resource allocation information may be received from a network entity, such as the base station 110, in a SIB or RRC signaling.

In one embodiment, the resource allocation information may comprise UL-DL configuration information, which is pre-set according to 3GPP TS 36. 211 for example, and information indicating one or more resource units allocated for the D2D communications and further comprise information regarding a subset of the one or more resource units allocated for the D2D communications, in which there will be cellular UL transmissions. In a case where the UL-DL configurations as specified in Table 1 may be pre-configured in the terminal device 120, the received resource allocation information may merely indicate the UL-DL configuration number. In one example, the resource allocation information may comprise the UL-DL configuration information as illustrated in FIG. 3 that indicates UL-DL configuration 0 is used. Also, the resource allocation information may comprise information indicating that HARQ-process 0, i.e. the subframes in a grid pattern in FIG. 3, is allocated for D2D communications of the terminal device 120, from which the terminal device 120 may know that subframes {2, 13, 24, 37, . . . } will be used for its D2D communications. In a case where there will be cellular UL transmissions in subframes {4, 14, 24, 34, . . . }, such as for periodical SRS transmissions, the resource allocation information may further comprise information indicating a subset {24 . . . } of the one or more subframes allocated for the D2D communications.

Therefore, based on the received resource allocation information, the terminal device 120 can judge whether there will be a collision between the cellular communications and the D2D communications on a specific resource unit, e.g. a subframe or a RB. In this example, there will be a collision between the D2D communications and the periodical SRS transmission on subframe 24.

Then, in response to determining that there will be a collision between the two different types of communications on the specific resource unit, i.e. subframe 24, the terminal device 120 adjusts one of the two different types of communications on the specific resource unit such that the collision can be avoided. In this embodiment, the terminal device may autonomously pause one of the two different types of communications on the colliding resource unit according to the determining result. In the above example, the terminal device 120 may pause the D2D transmission on subframe 24. Alternatively, if the two types of communications are conducted in a FDM way, the terminal device may reduce transmission power of one of the two different types of communications so as to minimize interference to the other of the two different types of communications, e.g. relying on FDM mode between the two types of communications. In the above example, the terminal device 120 may reduce transmission power of the cellular UL transmission, i.e. SRS transmission, so as to minimize interference to the D2D communications or directly drop the SRS transmission on subframe 24 as an extreme case of power reduction.

Afterwards, the terminal device 120 can resume the adjusted one of the two types of communications on a next non-colliding resource unit allocated for the adjusted type of communications on which it is determined that no collision will occur. In the above example, the terminal device 120 may resume the paused D2D transmission on subframe 37 at a normal power level or resume the dropped SRS on subframe 34.

Figure 4:
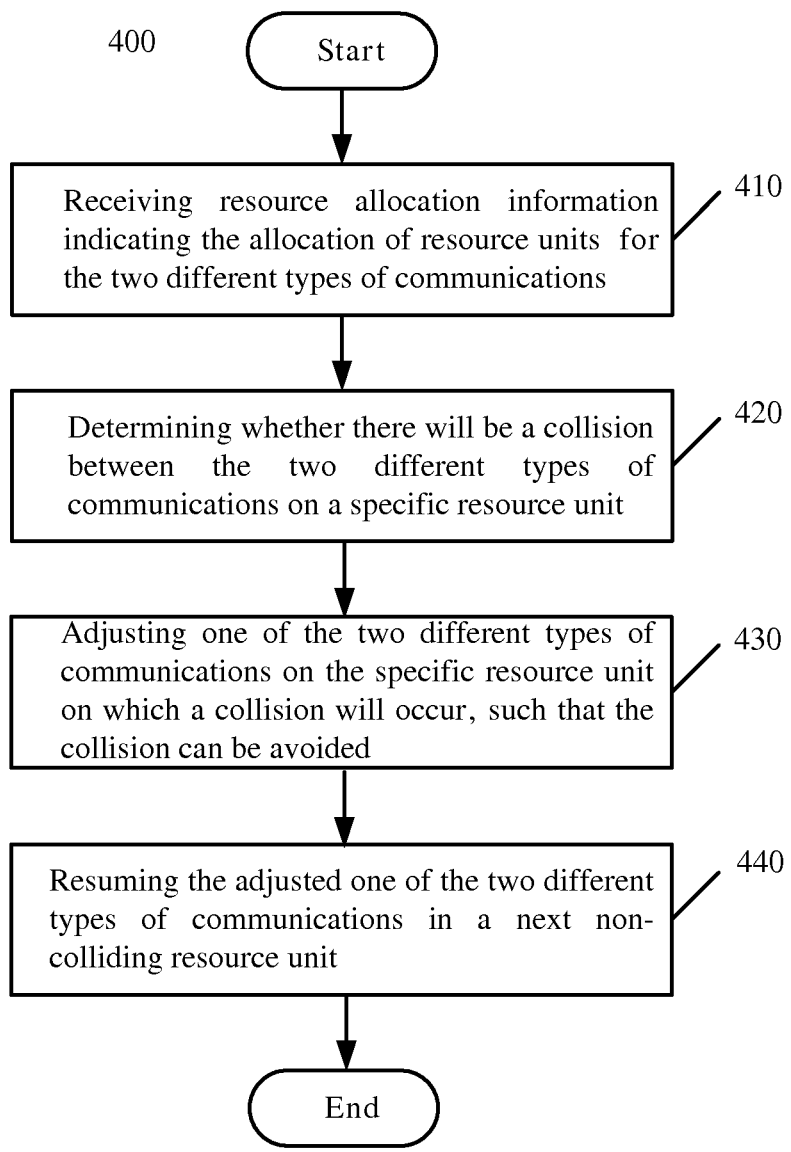
FIG. 4 illustrates a schematic flowchart of a method 400 for use in a terminal device for coordinating resources between two different types of communications according to embodiments of the present disclosure.

FIG. 4 illustrates a schematic flowchart of a method 400 for use in a terminal device for coordinating resources between two different types of communications, e.g. cellular communications and D2D communications, according to embodiments of the present disclosure. As illustrated in FIG. 4, at block 410, the method 400 receives resource allocation information indicating the allocation of resource units for the two different types of communications. In one embodiment, the two types of communications may comprise cellular communications and D2D communications. As an example, the resource allocation information may comprise information regarding a pre-set UL-DL configuration and one or more resource units allocated for the D2D communications. Additionally, the resource allocation information may further comprises information regarding a subset of the one or more resource units allocated for the device to device communication, in which there will be cellular transmissions.

Then, at block 420, the method 400 judges, based on the resource allocation information, whether there will be a collision between the two different types of communications on a specific resource unit. In some embodiments, the resource unit may comprise a subframe or a resource block.

In response to determining at block 420 that there will be a collision between the two different types of communications on the specific resource unit, the method 400 adjusts one of the two different types of communications on the specific resource unit such that the collision can be avoided.

In one embodiment, the adjusting at block 430 may be implemented by pausing the one of the two different types of communications or reducing transmission power of one of the two different types of communications to minimize interference to the other of the two different types of communications.

Afterwards, at block 440, the method 400 resumes the adjusted one of the two different types of communications on a next non-colliding resource unit allocated for the adjusted type of communications, on which it is determined that no collision will occur. Particularly, the method 400 may resume the adjusted type of communications at a normal transmission power level.

By virtue of the method 400 as performed in the terminal device and its several variants or improvements as set forth in the above embodiments, the resources can be effectively coordinated, in both TTI-specific way and HARQ process-specific way, between two different types of communications, e.g. D2D communications and cellular communications, and thereby collisions, e.g. between D2D transmissions with PUSCH retransmissions or with some static cellular UL transmissions, can be effectively avoided for all usable UL-DL configurations in a mixed cellular and D2D system.

Figure 5:
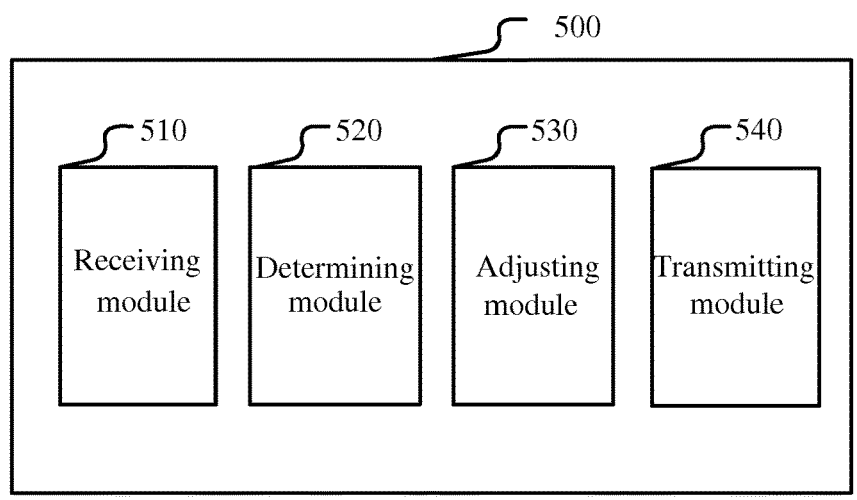
FIG. 5 illustrates a schematic block diagram of a terminal device 500 for coordinating resources between two different types of communications according to embodiments of the present disclosure.

FIG. 5 illustrates a schematic block diagram of a terminal device 500 for coordinating resources between two different types of communications according to an embodiment of the present disclosure. As illustrated in FIG. 5, the terminal device 500 comprises a receiving module 510 configured to receives resource allocation information indicating the allocation of resource units for the two different types of communications.

In one embodiment, the two types of communications may comprise cellular communications and D2D communications. As an example, the resource allocation information may comprise information regarding a pre-set UL-DL configuration and one or more resource units allocated for the D2D communications. Additionally, the resource allocation information may further comprises information regarding a subset of the one or more resource units allocated for the device to device communication in which there will be cellular transmissions.

The terminal device 500 also comprises a determining module 520 configured to judge, based on the resource allocation information, whether there will be a collision between the two different types of communications on a specific resource unit. In some embodiments, the resource unit may comprise a subframe or a resource block.

The terminal device 500 further comprises an adjusting module 530 configured to, in response that there will be a collision between the two different types of communications on the specific resource unit, adjust one of the two different types of communications on the specific resource unit such that the collision can be avoided. In one embodiment, the adjusting module 530 may further be configured to pause one of the two different types of communications. Alternatively, the adjusting module 530 may further be configured to reduce transmission power of one of the two different types of communications so as to minimize interference to the other of the two different types of communications. In a specific case, one of the two different types of communications may be dropped directly.

The terminal device 500 further comprises a transmitting module 540 configured to resume the adjusted one of the two different types of communications on a next non-colliding resource unit allocated for the adjusted type of communications, on which it is determined that no collision will occur. Particularly, the transmitting module 540 may be configured to resume the adjusted type of communications at a normal transmission power level.

Figure 6:
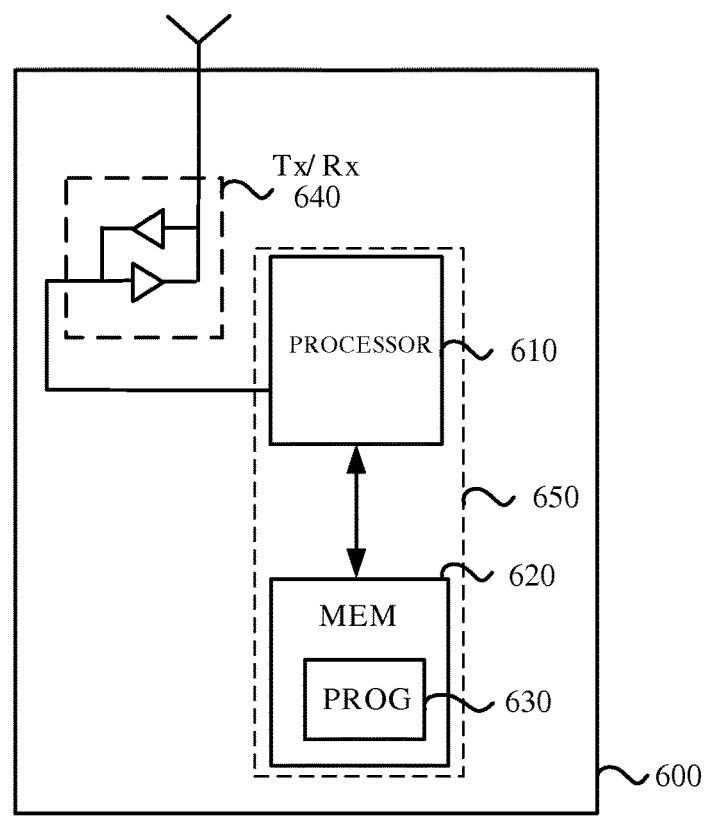
FIG. 6 illustrates a schematic block diagram of a terminal device 600 for coordinating resources between two types of communications according to embodiments of the present disclosure.

FIG. 6 illustrates a schematic block diagram of a terminal device 600 for coordinating resources between two types of communications according to embodiments of the present disclosure. As illustrated in FIG. 6, the terminal device 600 comprises at least one processor 610, such as a data processor, and at least one memory MEM 620 coupled to the processor 610. Depending on different implementations, the terminal device 600 may further comprise a suitable RF transmitter TX and receiver RX 640 coupled to the processor 610 so as to establish wireless connections with other devices or entities in the network. The MEM 620 stores a program PROG 630. A combination of the processor 610 and the MEM 620 may form processing means 650 adapted to implement the embodiments of the present disclosure.

The program 630 may comprise instructions that, when executed by the processor 610, enable the terminal device 600 to operate in accordance with the embodiments of the present disclosure, for example to perform the method 400.

In general, the embodiments of the present disclosure may be implemented by computer software executable by at least one processor 610 of the terminal device 600, or by hardware, or by a combination of software and hardware.

The MEM 620 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the terminal device 600, there may be several physically distinct memory devices in the terminal device 600. The processor 610 may be of any type suitable to the local technical environment, and may include one or more of general purpose computers, special purpose computers, microprocessors, digital signal processors DSPs and processors based on multicore processor architecture, as non-limiting examples. The terminal device 600 may have multiple processors, such as an application specific integrated circuit ASIC chip that is slaved in time to a clock which synchronizes with a main processor.

According to the above descriptions, the present disclosure proposes a terminal device for coordinating resources between two types of communications. The terminal device comprises at least one processor and at least one memory including computer program code. The at least one memory and the computer program code are configured to, with the at least one processor, cause the terminal device at least to receive resource allocation information indicating the allocation of resource units to the two different types of communications and judge, based on the resource allocation information, whether there will be a collision between the two different types of communications on a specific resource unit. The at least one memory and the computer program code are also configured to, with the at least one processor, cause the terminal device to, in response to determining that there will be a collision between the two different types of communications on the specific resource unit, adjust one of the two different types of communications on the specific resource unit such that the collision can be avoided. The at least one memory and the computer program code are further configured to, with the at least one processor, cause the terminal device to resume the adjusted one of the two different types of communications on a next non-colliding resource unit allocated for the adjusted type of communications on which no collision will occur. In one embodiment, the two different types of communications may comprise device to device communications and cellular communications.

In one embodiment, the at least one memory and the computer program code are configured to, with the at least one processor, cause the terminal device to pause one of the two different types of communications. Alternatively, the at least one memory and the computer program code are configured to, with the at least one processor, cause the terminal device to reduce transmission power of one of the two different types of communications so as to minimize interference to the other of the two different types of communications.

In one embodiment, the resource allocation information may comprise information regarding a pre-set UL-DL configuration and one or more resource units allocated for the device to device communication.

In a further embodiment, the resource allocation information may further comprises information regarding a subset of the one or more resource units allocated for the device to device communication in which there will be cellular transmissions.

In one embodiment, the resource unit may be a subframe or a resource block.

In one embodiment, at least one memory and the computer program code are configured to, with the at least one processor, cause the terminal device to receive the resource allocation information from a network entity.

The present disclosure further proposes a terminal device adapted for coordinating resources between two different types of communications. The terminal device comprises processing means adapted to receive resource allocation information indicating the allocation of resource units to the two different types of communications and judge, based on the resource allocation information, whether there will be a collision between the two different types of communications on a specific resource unit. The processing means is also adapted to, in response to determining that there will be a collision between the two different types of communications on the specific resource unit, adjust one of the two different types of communications on the specific resource unit such that the collision can be avoided. The processing means is further adapted to resume the adjusted one of the two different types of communications on a next non-colliding resource unit allocated for the adjusted type of communications on which no collision will occur.

In one embodiment, the processing means may comprise a processor and a memory, the memory containing instructions executable by the processor.

Each terminal device as proposed above could be embodied as the terminal device 600 as discussed with reference to FIG. 6, and therefore the at least one processor, the at least one memory, and the computer program code could be equally embodied as the processor 610, memory 620 and program 630, respectively.

Further, according to different implementation manners, the present disclosure also provides a computer program, comprising instructions which, when executed on at least one processor, e.g., the processor 610, cause the at least one processor to carry out the method according to any one of claims 1 to 7 as attached in the following claims.

In addition, the present disclosure provides a carrier containing the computer program as mentioned above, wherein the carrier is one of an electronic signal, optical signal, radio signal, or computer readable storage medium. computer readable storage medium.

Although the above embodiments of the present disclosure are described in a LTE TDD system, a person skilled in the art shall understand that they are also applicable to other TDD systems, such as a TD-SCDMA system. According to the embodiments of the present disclosure, the method 400 and the device terminal 500 or 600 are intended for coordinating resources between two different types of communications. However, as the technology advances, the inventive concept and principle can be implemented in various ways and may be easily extended for more than two types of communications. Therefore, the invention and its embodiments are not limited to the examples and embodiments described above and may vary within the scope of the claims.

The techniques described herein may be implemented by various means so that an device implementing one or more functions of a corresponding terminal device described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods, apparatuses, i.e. systems. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

The foregoing computer program instructions can be, for example, sub-routines and/or functions. A computer program product in one embodiment comprises at least one computer readable storage medium, on which the foregoing computer program instructions are stored. The computer readable storage medium can be, for example, an optical compact disk or an electronic memory device like a RAM (random access memory), a ROM (read only memory), Flash memory, magnetic tape, CD-ROM, DVD, Blue-ray disc and the like.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The disclosure and its embodiments are not limited to the examples described above but may vary within the scope of the claims.

It should also be noted that the above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method for use in a terminal device for coordinating resources between two different types of communications, comprising:
   receiving resource allocation information indicating an allocation of resource units for the two different types of communications;
   determining, based on the resource allocation information, whether a collision will occur between the two different types of communications on a specific resource unit, wherein the two different types of communications comprises device to device communications and cellular communications;
   in response to determining that a collision will occur between the two different types of communications on the specific resource unit, adjusting one of the two different types of communications on the specific resource unit to avoid the collision, wherein adjusting of the one of the two different types of communications on the specific resource unit comprises reducing transmission power of the one of the two different types of communications to minimize interference to the other of the two different types of communications; and
   resuming the adjusted one of the two different types of communications on a next non-colliding resource unit allocated for the adjusted one of the two different types of communications at a normal transmission power level,
   wherein the resource allocation information comprises information regarding a pre-set uplink-downlink configuration and one or more resource units allocated for the device to device communications and further comprises information regarding a subset of the one or more resource units allocated for the device to device communications and cellular transmissions.

2. The method according to claim 1, wherein the specific resource unit comprises one of a subframe and a resource block.

3. The method according to claim 1, wherein the resource allocation information is received from a network entity.

4. A terminal device configured to coordinate resources between two different types of communications, comprising:
   transceiver circuitry configured to support the two different types of communications; and at least one processor operatively associated with the transceiver and configured to: receive resource allocation information indicating an allocation of resource units for the two different types of communications, wherein the two different types of communications comprises device to device communications and cellular communications;
   determine, based on the resource allocation information, whether a collision will occur between the two different types of communications on a specific resource unit;
   in response to determining that a collision will occur between the two different types of communications on the specific resource unit, adjust one of the two different types of communications on the specific resource unit to avoid the collision, wherein the at least one processor is configured to adjust the one of the two different types of communications by reducing transmission power of the one of the two different types of communications to minimize interference to the other of the two different types of communications; and
   resume the adjusted one of the two different types of communications on a next non-colliding resource unit allocated for the adjusted one of the two different types of communications at a normal transmission power level,
   wherein the resource allocation information comprises information regarding a pre-set uplink-downlink configuration and one or more resource units allocated for the device to device communications and further comprises information regarding a subset of the one or more resource units allocated for the device to device communications and cellular transmissions.

5. The terminal device according to claim 4, wherein the specific resource unit comprises one of a subframe and a resource block.

6. The terminal device according to claim 4, wherein the at least one processor is configured to receive the resource allocation information from a network entity.

7. A non-transitory computer readable storage medium storing a computer program comprising program instructions that, when executed on at least one processor of a terminal device, configure the terminal device for coordinating resources between two different types of communications, and said computer program comprising program instructions causing the terminal device to:

receive resource allocation information indicating an allocation of resource units for the two different types of communications, wherein the two different types of communications comprises device to device communications and cellular communications:

determine, based on the resource allocation information, whether a collision will occur between the two different types of communications on a specific resource unit;

in response to determining that a collision will occur between the two different types of communications on the specific resource unit, adjust one of the two different types of communications on the specific resource unit to avoid the collision wherein computer program comprising program instructions causing the terminal device to adjust one of the two different types of communications on the specific resource unit by reducing transmission power of the one of the two different types of communications to minimize interference to the other of the two different types of communications; and resume the adjusted one of the two different types of communications on a next non-colliding resource unit allocated for the adjusted one of the two different types of communications at a normal transmission power level, wherein the resource allocation information comprises information regarding a pre-set uplink-downlink configuration and one or more resource units allocated for the device to device communications and further comprises information regarding a subset of the one or more resource units allocated for the device to device communications and cellular transmissions.

* * * * *